US012703839B2

(12) United States Patent
Lo et al.

(10) Patent No.: US 12,703,839 B2

(45) Date of Patent: Aug. 11, 2026

(54) FLOOR STRIPPING COMPOSITIONS COMPRISING BENZYL ALCOHOL AND TWO NONIONIC SURFACTANTS AND METHODS OF USING THE SAME

(71) Applicant: ECOLAB USA INC., Saint Paul, MN (US)

(72) Inventors: Wendy Lo, Saint Paul, MN (US); Erik C. Olson, Saint Paul, MN (US); Carter M. Silvernail, Saint Paul, MN (US); Traci Gioino, Saint Paul, MN (US); Avila Abelseth, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 515 days.

(21) Appl. No.: 18/316,585

(22) Filed: May 12, 2023

(65) Prior Publication Data

US 2023/0365890 A1 Nov. 16, 2023

Related U.S. Application Data

(60) Provisional application No. 63/364,651, filed on May 13, 2022.

(51) Int. Cl.

| | |
|---|---|
| ***C11D 1/825*** | (2006.01) |
| ***C11D 3/43*** | (2006.01) |
| ***C11D 11/00*** | (2006.01) |

(52) U.S. Cl.

CPC ................ *C11D 1/825* (2013.01); *C11D 3/43* (2013.01); *C11D 11/0094* (2013.01); *C11D 2111/14* (2024.01); *C11D 2111/44* (2024.01)

(58) Field of Classification Search

CPC ........... C11D 1/72; C11D 1/721; C11D 1/825; C11D 3/2034; C11D 3/30; C11D 3/3418; C11D 3/43; C11D 7/261; C11D 7/3218; C11D 7/5004; C11D 2111/14

See application file for complete search history.

(56) References Cited

U.S. PATENT DOCUMENTS

| | | | | |
|---|---|---|---|---|
| 4,077,896 A | | 3/1978 | Bunegar et al. | |
| 4,861,518 A | | 8/1989 | Morganson et al. | |
| 5,096,610 A | | 3/1992 | Bingham | |
| 5,342,551 A | | 8/1994 | Ruckle | |
| 5,637,559 A | * | 6/1997 | Koreltz | C11D 7/5022 510/206 |
| 5,977,042 A | | 11/1999 | Hernandez et al. | |
| 6,403,546 B1 | | 6/2002 | Hernandez et al. | |
| 6,440,225 B1 | | 8/2002 | Van Den Burg et al. | |
| 7,365,046 B2 | | 4/2008 | Griese et al. | |
| 7,674,760 B2 | | 3/2010 | Hei et al. | |
| 2003/0125226 A1 | * | 7/2003 | Lewis | C09D 9/02 510/214 |
| 2006/0234889 A1 | | 10/2006 | Griese et al. | |
| 2006/0234890 A1 | | 10/2006 | Griese et al. | |
| 2007/0087952 A1 | | 4/2007 | Hei et al. | |
| 2007/0095003 A1 | * | 5/2007 | Hei | C09D 9/005 52/741.1 |
| 2009/0131296 A1 | * | 5/2009 | Kriens | C11D 1/04 510/207 |
| 2011/0212866 A1 | | 9/2011 | Rao et al. | |
| 2012/0128614 A1 | * | 5/2012 | Rieth | A61K 8/4973 510/234 |
| 2012/0252713 A1 | * | 10/2012 | Beatty | C11D 17/0021 510/214 |
| 2013/0065809 A1 | * | 3/2013 | Savaglio | C11D 3/30 510/212 |
| 2013/0274166 A1 | * | 10/2013 | Savaglio | C09D 7/63 510/212 |
| 2014/0274856 A1 | | 9/2014 | Thompson et al. | |
| 2019/0023907 A1 | | 1/2019 | Merten et al. | |

FOREIGN PATENT DOCUMENTS

| | | |
|---|---|---|
| CN | 103087837 A | 5/2013 |
| EP | 1937783 B1 | 11/2016 |
| JP | H07179892 A | 7/1995 |
| JP | 4324412 B2 | 9/2009 |
| JP | 5113423 B2 | 1/2013 |

OTHER PUBLICATIONS

International Search Report and Written Opinion in PCT/US2023/066926, mailed Jul. 8, 2023, 12 pages.

* cited by examiner

*Primary Examiner* — Charles I Boyer

(74) *Attorney, Agent, or Firm* — McKee, Voorhees & Sease, PLC

(57) ABSTRACT

The disclosure relates to floor stripping compositions, methods of making the floor stripping compositions, and methods of using the floor stripping compositions. In particular, the floor stripping compositions have a low surface tension. Preferably, the floor stripping compositions have low contact angles on a variety of surfaces. Most preferably, the floor stripping compositions are suitable for stripping acrylic floor finishes and acrylic polyurethane hybrid floor finishes.

20 Claims, 4 Drawing Sheets
(4 of 4 Drawing Sheet(s) Filed in Color)

FLOOR STRIPPING COMPOSITIONS COMPRISING BENZYL ALCOHOL AND TWO NONIONIC SURFACTANTS AND METHODS OF USING THE SAME

CROSS-REFERENCE TO RELATED APPLICATIONS

This application claims priority under 35 U.S.C. § 119 to provisional application Ser. No. 63/364,651, filed May 13, 2022, herein incorporated by reference in its entirety.

FIELD OF THE INVENTION

The invention relates to floor stripping compositions. In particular, floor stripping compositions are free of fluorinated surfactants.

BACKGROUND OF THE INVENTION

Floor strippers are used to remove worn or discolored floor finishes from flooring substrates (e.g., vinyl composition tiles) so that a new finish may be applied. Floor scrub and recoat materials are used to carry out a procedure sometimes referred to as "deep scrubbing" so that a fresh layer of floor finish may be applied atop an existing floor finish. Many floor strippers and floor scrub and recoat materials have a high pH, which may irritate a user's skin, or may stain or otherwise damage linoleum and other substrates. Some strippers or scrub and recoat materials "dewet" (appear to bead up upon or otherwise insufficiently wet) a floor shortly after being applied, and may continue to dewet until the user swabs the applied material back and forth a few times. Some floor finishes (e.g., crosslinked floor finishes) are especially difficult to remove and may require multiple applications of a floor stripper formulation or long dwell times. Many contemporary floor strippers rely on fluorinated compounds including fluorinated surfactants. Recent research has demonstrated that fluoride pollution is an increasing environmental concern as fluorinated compounds can accumulate in soil and water, which harms plant growth and yield.

Accordingly, it is an objective of this disclosure to provide floor stripping compositions that are useful on varying floor surface types.

Still a further objective of this disclosure is providing floor stripping compositions that have no fluorinated compounds.

Another objective of this disclosure is to provide floor stripping compositions that do not dewet.

Other objects, advantages and features of this disclosure will become apparent from the following specification taken in conjunction with the accompanying figures.

BRIEF SUMMARY OF THE INVENTION

The floor stripping compositions described herein are advantageous as they are useful on varying floor surface types. Still another advantage of the floor stripping compositions disclosed herein is that they are free of fluorinated surfactants, preferably all fluorinated compounds. Another advantage of the floor stripping compositions is that they do not dewet (bead up) on the floor surface. Other advantages can be identified in this disclosure and examples.

A preferred embodiment is a concentrated floor stripping composition comprising from about 50 wt. % to about 85 wt. % of a solvent system; wherein the solvent system comprises a first solvent and a second solvent; from about 1 wt. % to about 12 wt. % of a nonionic surfactant system; wherein the nonionic surfactant system comprises at least two nonionic surfactants; a coupler; and water; wherein the composition contains less than 0.01 wt. % of a fluorinated surfactant.

A preferred embodiment is a concentrated floor stripping composition comprising from about 50 wt. % to about 85 wt. % of a solvent system; wherein the solvent system comprises a first solvent and a second solvent; wherein the first solvent is benzyl alcohol and is in an amount from about 35 wt. % to about 65 wt. % of the composition; from about 1 wt. % to about 12 wt. % of a nonionic surfactant system; wherein the nonionic surfactant system comprises at least two nonionic surfactants; a coupler; and water; wherein the composition contains less than 0.01 wt. % of a fluorinated surfactant.

A preferred embodiment is a concentrated floor stripping composition comprising from about 50 wt. % to about 85 wt. % of a solvent system; wherein the solvent system comprises benzyl alcohol and an alkanolamine; from about 1 wt. % to about 12 wt. % of a nonionic surfactant system; wherein the nonionic surfactant system comprises at least two nonionic surfactants; wherein the nonionic surfactant system comprises a first nonionic surfactant, wherein the first nonionic surfactant is an alkoxylated nonionic surfactant having from about 1 to about 5 moles of alkoxylation, and a second nonionic surfactant, wherein the second nonionic surfactant is an alkoxylated nonionic surfactant having from about 7 to about 11 moles of alkoxylation; from about 5 wt. % to about 20 wt. % of a coupler; and from about 5 wt. % to about 25 wt. % water; wherein the composition contains less than 0.01 wt. % of a fluorinated surfactant.

A preferred embodiment comprises a use solution of any of the foregoing concentrated floor stripping compositions diluted with water at a ratio of between about 1 oz. to about 32 oz. of floor stripping composition to one gallon of water.

The present disclosure also describes methods of preparing the floor stripping compositions including methods of preparing the concentrated compositions and use solutions.

The present disclosure also describes methods of stripping a floor comprising contacting a surface of the floor with a floor stripping composition.

While multiple embodiments are disclosed, still other embodiments will become apparent to those skilled in the art from the following detailed description, examples, and accompanying figures, which shows and describes illustrative embodiments of the invention. Accordingly, the figures and detailed description are to be regarded as illustrative in nature and not restrictive.

BRIEF DESCRIPTION OF THE FIGURES

The patent or application file contains at least one figure executed in color. Copies of this patent or patent application publication with color drawing(s) will be provided by the Office upon request and payment of the necessary fee.

Figure 1:
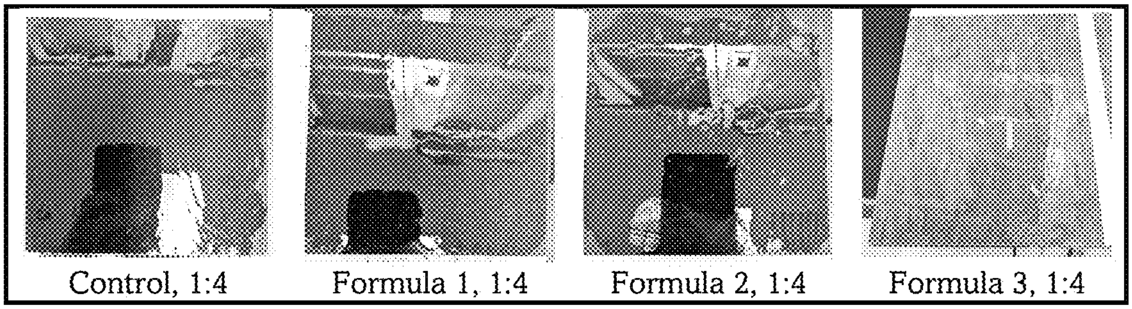
FIG. 1 is a series of photographs showing the spreading of a first application of floor stripping compositions.
Figure 2A:
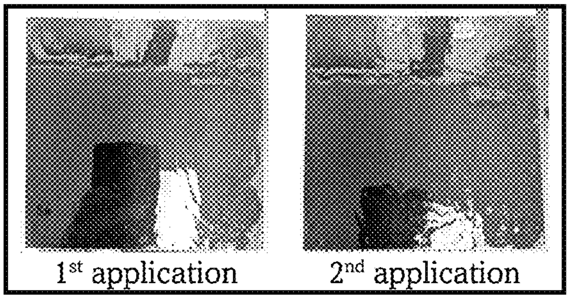
FIG. 2A is a series of photographs showing the spreading of a floor stripping composition with the Control composition.
Figure 2B:
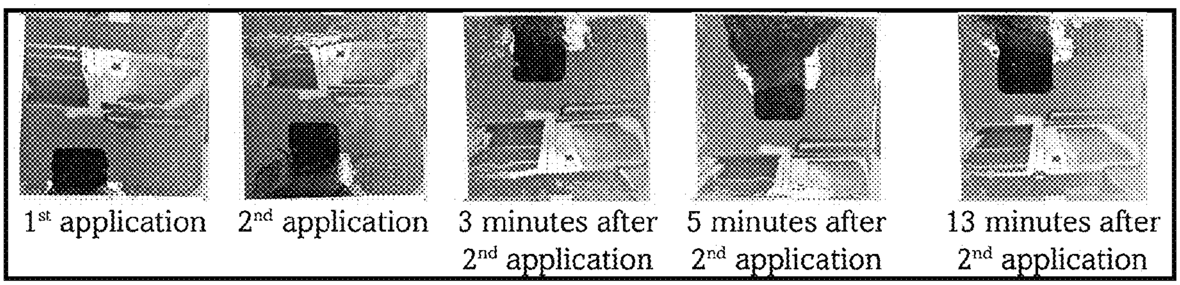
FIG. 2B is a series of photographs showing the spreading of a floor stripping composition with Formula 1.
Figure 2C:
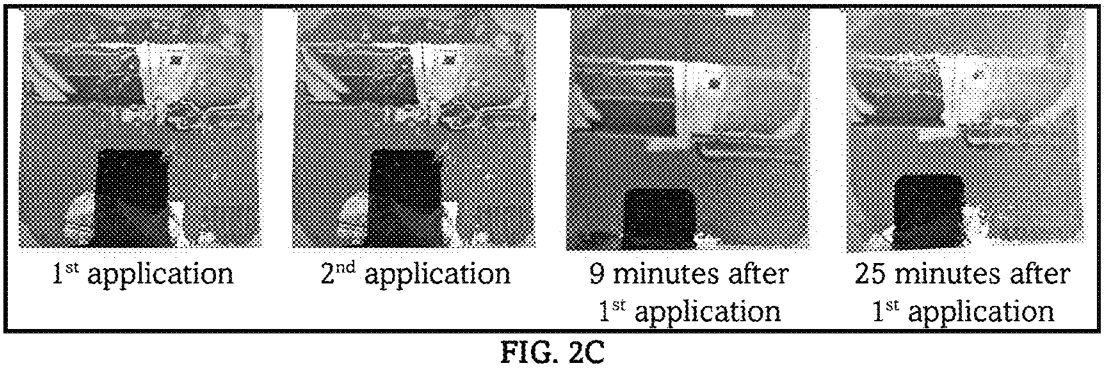
FIG. 2C is a series of photographs showing the spreading of a floor stripping composition with Formula 2.
Figure 2D:
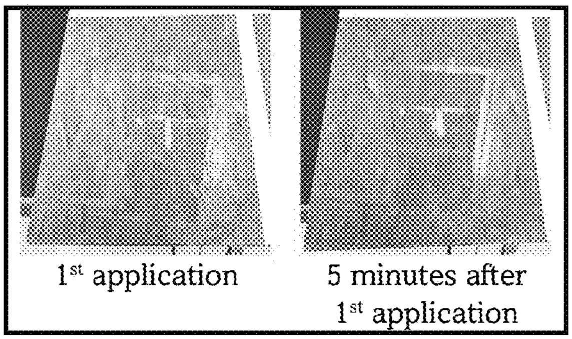
FIG. 2D is a series of photographs showing the spreading of a floor stripping composition with Formula 3.

Various embodiments of the present invention will be described in detail with reference to the figures. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present disclosure relates to floor stripping compositions that are free of fluorinated surfactants, and methods of making and using the same. The floor stripping compositions, and methods of stripping a floor, as described herein have many advantages over existing floor stripping compositions and methods. For example, the floor stripping compositions are suitable on varying floor surface types. A further advantage of the floor stripping compositions disclosed herein is that they are free of fluorinated surfactants, preferably all fluorinated compounds. Another advantage of the floor stripping compositions is that they do not dewet (bead up) on the floor surface.

The embodiments of this invention are not limited to particular hard surfaces or soils, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, concentration, mass, volume, time, surface tension, molecular weight, contact angle, pH, temperature, humidity, and molar ratios. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

As used herein, the term "analog" means a molecular derivative of a molecule. The term is synonymous with the terms "structural analog" or "chemical analog."

As used herein, the term "oligomer" refers to a molecular complex comprised of between one and ten monomeric units. For example, dimers, trimers, and tetramers, are considered oligomers. Furthermore, unless otherwise specifically limited, the term "oligomer" shall include all possible isomeric configurations of the molecule, including, but are not limited to isotactic, syndiotactic and random symmetries, and combinations thereof. Furthermore, unless otherwise specifically limited, the term "oligomer" shall include all possible geometrical configurations of the molecule.

As used herein the term "polymer" refers to a molecular complex comprised of a more than ten monomeric units and generally includes, but is not limited to, homopolymers, copolymers, such as for example, block, graft, random and alternating copolymers, terpolymers, and higher "x"mers, further including their analogs, derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

The term "actives" or "percent actives" or "percent by weight actives" or "actives concentration" are used interchangeably herein and refers to the concentration of those ingredients expressed as a percentage minus inert ingredients such as water or salts. It is also sometimes indicated by a percentage in parentheses, for example, "chemical (10%)."

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or “cycloalkyl” or “alicyclic” or “carbocyclic” groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term “alkyl” includes both “unsubstituted alkyls” and “substituted alkyls.” As used herein, the term “substituted alkyls” refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term “heterocyclic group” includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

An “antiredeposition agent” refers to a compound that helps keep suspended in water instead of redepositing onto the object being cleaned. Antiredeposition agents are useful in the present disclosure to assist in reducing redepositing materials removed from the floor.

The term “weight percent,” “wt. %,” “wt-%,” “percent by weight,” “% by weight,” and variations thereof, as used herein, refer to the concentration of a substance as the weight of that substance divided by the total weight of the composition and multiplied by 100.

As used herein, the term “cleaning” refers to a method used to facilitate or aid in soil removal.

As used herein, the terms “floor”, “floor surface” and “floor surface type”—plural or singular—refer to continuous floors, tiled floors, planked floors, the materials making up the floor include resilient floors. Resilient floors include, but are not limited to, vinyl composition tiles, vinyl sheet flooring, linoleum, rubber sheeting, rubber tile, cork, synthetic sports flooring and vinyl asbestos tile. It should be understood that floor surface types can be included on hard surfaces other than the floor itself. For example, floor surfaces can be used on countertops, sinks, tables, walls, and ceilings. Moreover, it should be understood that the compositions and methods of this disclosure can be useful in a variety of locations where a floor is found, including, but not limited to, hospital floors, kitchen floors, bathroom floors, restaurant floors, manufacturing floors, hotel floors, residential floors, commercial business floors, and factory floors.

As used herein, the terms “finish” and “floor finish” refer to a protective coating added to a floor surface. Finishes which the floor stripping compositions and methods are suitable for removing, include, hardenable floor finishes, hardened floor finishes, polyurethane floor finishes, and floor polishes. More specifically, finishes which the floor stripping compositions and methods are suitable for removing, include, but are not limited to, acrylic finishes, polyurethane acrylic hybrid finishes, zinc crosslinked acrylic dispersion finishes, acrylic styrene polymer emulsion finishes, hydroxyl-functional acrylic polymer dispersion finishes, metal-free acrylic polymer emulsion finishes, and metal cross-linked acrylic polymer finishes. Preferably, the floor finish is a polyurethane acrylic hybrid finish. In a preferred embodiment, the floor stripping compositions are not applied to a urethane finish.

The phrase “hardenable floor finish” refers to an applied liquid coating that through a chemical or physical process (including solvent evaporation or other drying processes, photochemical reactions, electrochemical reactions, radical processes, thermal processes, ionic processes, moisture cure processes or multiple-component (e.g., two- or three-component) crosslinking processes) can become dried, cross-linked or otherwise cured in situ to form a tack-free film on a floor. The phrase “hardened floor finish” refers to such a dried, cross-linked or otherwise cured floor finish.

The phrases “scrubbing and recoating” and “deep scrubbing” refer to applying, at such time as it may be desired to do so, a finish removal composition to a hardened floor finish atop an underlying installed flooring substrate without removing all of the hardened floor finish, and cleaning the hardened floor finish surface sufficiently so that an additional layer or layers of hardenable floor finish may be applied thereto and hardened. Compositions suitable for floor scrubbing or deep scrubbing are typically not as aggressive as floor stripping compositions and thus do not provide sufficient removal of layers. This is because scrubbing and deep scrubbing are focused on the removal of only few top layers of finish as opposed to all layers of a finish. In many circumstances, floor scrubbing and deep scrubbing compositions have a lower pH than that of a floor stripping composition.

As used herein, the terms “stripping” and “stripped” refer to the removal of a finish from a floor surface. This can include removal of a single finish layer, multiple layers of a floor finish, or most preferably most or all layers of a floor finish on a floor. The phrase “stripping a floor finish” refers to removing, at such time as it may be desired to do so, a hardened floor finish from an underlying installed flooring substrate without removing substantial portions of the flooring substrate. Such stripping preferably employs minimally abrasive techniques such as pouring or mopping application of the stripper followed a standing time for the stripper to effect the finish. Preferably the standing time is at least about 5 minutes, at least about 10 minutes, at least about 20 minutes, at least about 25 minutes, at least about 30 minutes, at least about 35 minutes, at least about 40 minutes, at least about 45 minutes, at least about 50 minutes, at least about 55 minutes, or at least about 1 hour. More preferably, the standing time is between about 5 minutes and about 3 hours, more preferably between about 10 minutes and about 2 hours, still more preferably between about 15 minutes and about 90 minutes. During the standing time, it is preferred that the stripping composition not dry out on the surface; thus, reapplication of the stripping composition can be employed. Once the stripping composition has been in contact with the floor surface for a sufficient time, stripping is preferably performed with an abrasive technique that is flooring-safe measures including, but not limited to, abrading the finish during the standing time using, e.g., a non-woven floor scrub pad. This is distinct from dry techniques performed without a stripping composition such as sanding.

As used herein, the term "substantially free" refers to floor stripping compositions completely lacking a component or having such a small amount of the component that the component does not affect the performance of the floor stripping compositions. The component may be present as an impurity or as a contaminant and shall be less than about 0.5 wt. %. In another embodiment, the amount of the component is less than about 0.1 wt. %, and in yet another embodiment the amount of component is less than about 0.01 wt. %.

The terms "water soluble" and "water dispersible" as used herein, means that the polymer is soluble or dispersible in water in the inventive compositions. In general, the polymer should be soluble or dispersible at 25° C. at a concentration of 0.0001% by weight of the water solution and/or water carrier, preferably at 0.001%, more preferably at 0.01% and most preferably at 0.1%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Floor Stripping Compositions

The floor stripping compositions comprise a solvent system, a nonionic surfactant, a coupler, and water. In some embodiments, a pH modifier can be added. Other additional functional ingredients can be added if desired. The floor stripping compositions can also comprise a variety of optional ingredients in some embodiments, including, but not limited to, a dye, and/or a fragrance. The floor stripping compositions can be prepared as liquid concentrated compositions. The concentrated floor stripping compositions can be diluted to form a use solution. Preferably, the concentrated floor stripping compositions have a viscosity of about 100 cps or less, more preferably about 90 cps or less, still more preferably about 85 cps or less.

Preferably, the floor stripping compositions have a pH between about 10.5 and about 14, more preferably between about 11 and about 14, most preferably between about 12 and about 14.

We found that in order to adequately wet many of the hard surfaces that exist today, it was necessary to further reduce the surface tension of the floor stripping compositions. This provided the best stripping. Preferably, the floor stripping compositions have a surface tension of less than about 35 mN/m, more preferably less than about 32 mN/m, still more preferably less than about 30 mN/m, even more preferably less than about 29 mN/m, most preferably about 28 mN/m or less. A preferred method of measuring the surface tension is with a surface tensiometer. Surface tensiometers can be purchased from a variety of commercial sources including, but not limited to, Biolin Scientific and Kibron.

While contact angle can be influenced by the floor surface type, we found that it was preferable for the floor stripping compositions to generally provide a surface contact angle of less than about 35°, more preferably less than about 30°, most preferably less than about 28° after contacting the surface for about 1 second or less. A preferred method of measuring the contact angle is with an optical tensiometer. Optical tensiometers can be purchased from a variety of commercial sources including, but not limited to, Biolin Scientific which sells the Attension® optical tensiometer.

In a preferred embodiment, the floor stripping compositions provide a surface contact angle of about 35° or less, more preferably of about 30° or less, most preferably of about 28° after contacting the surface for about 1 seconds to about 30 seconds.

In a preferred embodiment, the floor stripping compositions provide a surface contact of less than about 35°, more preferably about 30° or less, most preferably about 28° or less on a vinyl composite tile surface after about 1 to about 30 seconds.

In a preferred embodiment, the floor stripping compositions provide a surface contact of less than about 35°, more preferably less than about 30°, most preferably less than about 28° on ceramic tile after about 1 to about 30 seconds.

In a preferred embodiment, the floor stripping compositions contain less than about 0.5 wt. %, more preferably less than about 0.1 wt. %, still more preferably less than about 0.01 wt. %, most preferably they are free of a fluorinated surfactant. In a preferred embodiment, the floor stripping compositions contain less than about 0.5 wt. %, more preferably less than about 0.1 wt. %, still more preferably less than about 0.01 wt. %, most preferably they are free of a fluorinated compound.

Preferred embodiments of the floor stripping compositions are described in Tables land 2 below.

TABLE 1

Preferred Floor Stripper Compositions

| Ingredient | Preferred Range (wt. %) | More Preferred Range (wt. %) | Most Preferred Range (wt. %) |
|---|---|---|---|
| Solvent System | 50-85 | 55-80 | 60-70 |
| Coupler | 5-20 | 7-18 | 9-15 |
| Nonionic Surfactant | 1-12 | 2-10 | 3-9 |
| pH Modifier | 0-10 | 0-5 | 0.01-3 |
| Water | 5-25 | 8-20 | 10-18 |
| Optional Ingredients | 0-20 | 0.01-20 | 0.01-15 |

TABLE 2

More Preferred Floor Stripper Compositions

| Ingredient | Preferred Range (wt. %) | More Preferred Range (wt. %) | Most Preferred Range (wt. %) |
|---|---|---|---|
| Benzyl Alcohol | 35-65 | 40-60 | 45-55 |

TABLE 2-continued

More Preferred Floor Stripper Compositions

| Ingredient | Preferred Range (wt. %) | More Preferred Range (wt. %) | Most Preferred Range (wt. %) |
|---|---|---|---|
| Alkanolamine | 5-30 | 10-25 | 15-25 |
| Coupler | 5-20 | 7-18 | 9-15 |
| Alkoxylated Nonionic Surfactant (1-5 moles alkoxylation) | 0.5-6 | 1-5 | 1.5-4.5 |
| Alkoxylated Nonionic Surfactant (7-11 moles alkoxylation) | 0.5-6 | 1-5 | 1.5-4.5 |
| Alkalinity Source | 0-10 | 0-5 | 0.01-3 |
| Water | 5-25 | 8-20 | 10-18 |
| Optional Ingredients | 0-20 | 0.01-20 | 0.01-15 |

In a preferred embodiment, the concentrated floor stripping compositions can be diluted with water to form an solution. Preferably, the concentrated stripping compositions are diluted at a dose of between about 8 oz to about 32 oz of concentrated composition to about 1 gallon of water, which provide dilution ratios of between about 1:16 and about 1:4, respectively. In another embodiment, the concentrate compositions can be diluted through any suitable dispensing equipment.

The water used to dilute the concentrate (water of dilution) can be available at the locale or site of dilution. The water of dilution may contain varying levels of hardness depending upon the locale. Service water available from various municipalities have varying levels of hardness. It is desirable to provide a concentrate that can handle the hardness levels found in the service water of various municipalities. The water of dilution that is used to dilute the concentrate can be characterized as hard water when it includes at least 1 grain hardness. It is expected that the water of dilution can include at least 5 grains hardness, at least 10 grains hardness, or at least 20 grains hardness.

Nonionic Surfactant

The floor stripping compositions comprise a nonionic surfactant. Preferably the compositions are free of foaming surfactants which can interfere with autoscrubbers and wet vacuums. In a preferred embodiment, the concentrated floor stripping compositions comprise between about 1 wt. % and about 12 wt. %, more preferably between about 2 wt. % and about 10 wt. %, and most preferably between about 3 wt. % and about 9 wt. % of a nonionic surfactant.

Preferred nonionic surfactants include alkoxylated surfactants. Suitable nonionic surfactants can include, but are not limited to, alkoxylated surfactants. Alkoxyated may comprise ethylene, propylene, butylene oxide, or mixtures thereof. Preferred alkoxylated surfactants have between about 8 carbons and about 30 carbons and can be linear or branched. Preferred alkoxylated surfactants include EO/PO copolymers, capped EO/PO copolymers, alcohol alkoxylates, capped alcohol alkoxylates, extended alkoxylates, mixtures thereof. In a more preferred embodiment the alkoxylated surfactant comprises a linear alcohol alkoxylate. In a most preferred embodiment, the alkoxylated surfactant comprises a linear alcohol ethoxylate.

In a preferred embodiment, the floor stripping compositions comprise at least two nonionic surfactants a first nonionic surfactant and a second nonionic surfactant. Preferably, the first nonionic surfactant comprises an alkoxylated surfactant having between 1 and 5 moles of alkoxylation, and the second nonionic surfactant comprises an alkoxylated surfactant having between 7 and 11 moles of alkoxylation. More preferably, the first nonionic surfactant comprises an alcohol alkoxylate having between 1 and 5 moles of alkoxylation, and the second nonionic surfactant comprises an alcohol alkoxylate having between 7 and 11 moles of alkoxylation. More preferably, the first nonionic surfactant comprises a linear alcohol ethoxylate surfactant having between 1 and 5 moles of ethoxylation, and the second nonionic surfactant comprises a linear alcohol ethoxylate surfactant having between 7 and 11 moles of ethoxylation. Preferably a linear alcohol ethoxylate has a carbon chain length of from about 8 carbons to about 20 carbons, more preferably from about 10 carbons to about 18 carbons, most preferably from about 12 carbons to about 15 carbons.

In a most preferred embodiment, the first nonionic surfactant comprises a C6-C20 linear alcohol ethoxylate surfactant having between 1 and 5 moles of ethoxylation, and the second nonionic surfactant comprises a C6-C20 linear alcohol ethoxylate surfactant having between 7 and 11 moles of ethoxylation; more preferably the first nonionic surfactant comprises a C10-C18 linear alcohol ethoxylate surfactant having between 1 and 5 moles of ethoxylation, and the second nonionic surfactant comprises a C10-C18 linear alcohol ethoxylate surfactant having between 7 and 11 moles of ethoxylation; most preferably more preferably the first nonionic surfactant comprises a C12-C15 linear alcohol ethoxylate surfactant having between 1 and 5 moles of ethoxylation, and the second nonionic surfactant comprises a C12-C15 linear alcohol ethoxylate surfactant having between 7 and 11 moles of ethoxylation.

Solvent System

The floor stripping compositions comprise a solvent system. Preferably the solvent system comprises at least two solvents. Any suitable number of solvents can be included. Preferably, there are two solvents, three solvents, four solvents, five solvents, or six solvents. In a most preferred embodiment there are two solvents a first solvent and a second solvent.

Preferably the floor stripping compositions comprise between about 50 wt. % and about 85 wt. % of the solvent system; more preferably between about 55 wt. % and about 80 wt. % of the solvent system; and most preferably between about 60 wt. % and about 70 wt. % of the solvent system. In an embodiment having two solvents, the first solvent is preferably in a concentration of between about 5 wt. % and about 30 wt. %, more preferably between about 10 wt. % and about 25 wt. %, most preferably between about 15 wt. % and about 25 wt. %; and the second solvent is preferably in a concentration of between about 5 wt. % and about 30 wt. %, more preferably between about 10 wt. % and about 25 wt. %, most preferably between about 15 wt. % and about 25 wt. %.

Suitable solvents include, but are not limited to, benzyl alcohol, an alkanolamine, a glycol ether, or mixtures thereof. Preferred alkanolamines include, but are not limited to, monoethanolamine, monopropanolamine, diethanolamine, dipropanolamine, triethanolamine, tripropanolamine, and mixtures of the same.

Suitable glycol ethers include, but are not limited to, diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether, propylene glycol phenyl ether, and the like, or mixtures thereof. In a preferred embodiment, the solvent system comprises about 10 wt. % or less of a glycol ether solvent, more preferably about 5 wt. % or less of a glycol ether solvent, most preferably less than 1 wt. % of a glycol ether solvent. In a most preferred embodiment, the solvent system does not include a glycol ether solvent.

In a most preferred embodiment, the solvent system comprises benzyl alcohol as a first solvent and an alkanolamine as a second solvent.

Coupler

The floor stripping compositions comprise a coupler. Preferably, the floor stripping compositions comprise between about 5 wt. % and about 20 wt. % of a coupler, more preferably between about 7 wt. % and about 18 wt. %, most preferably between about 9 wt. % and about 15 wt. % of a coupler.

Preferred couplers comprise short chain alkyl benzene and/or alkyl naphthalene sulfonates. Preferred alkyl benzene sulfonates are those based on toluene, xylene, and cumene, and alkyl naphthalene sulfonates. Alkyl benzene and/or alkyl naphthalene sulfonates. have the general formula below:

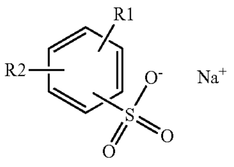

R1 = C1, C2 or C3
R2 = C1 or H
ALKYBENZENE SULFONATE

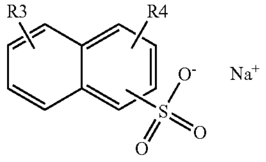

R3= C1, C2, C3, C4 or H
R4 = C1, C2, C3, C4 or H
ALKYLNAPHTHALENE SULFONATE

Preferred short chain alkyl benzene and alkyl naphthalene sulfonates include, but are not limited to, sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, sodium butylnaphthalene sulfonate, and mixtures thereof.

pH Modifier

In some embodiments, the floor stripping compositions can optionally comprise a pH modifier. The pH modifier chosen can be based on the desired pH of the compositions. In another aspect of the invention, a pH modifier can be as a neutralizer. Suitable pH modifiers include an acid source, an alkalinity source, or a mixture thereof. In a preferred embodiment, no pH modifier is included. However, in some embodiments a pH modifier can be added to provide stability for the compositions at high temperatures and near freezing temperatures.

Preferably, the floor stripping compositions have a pH of at least about 12.0, at least about 12.1, at least about 12.2, at least about 12.3, at least about 12.4, at least about 12.5, at least about 12.6, at least about 12.7, at least about 12.8, at least about 12.9, at least about 13.0, at least about 13.1, at least about 13.2, at least about 13.3, at least about 13.4, at least about 13.5, at least about 13.6, at least about 13.7, at least about 13.8, at least about 13.9, or about 14.0. Described another way, the compositions preferably have a pH of between about 12.0 and about 14.0.

Acid Source

In some embodiments, the floor stripping compositions can optionally include an acid source as an alkaline neutralizer or to reduce the pH.

Suitable acid sources, can include, organic and/or inorganic acids. Examples of suitable organic acids include carboxylic acids such as but not limited to hydroxyacetic (glycolic) acid, citric acid, formic acid, acetic acid, propionic acid, butyric acid, valeric acid, capric acid, caproic acid, oleic acid, trichloroacetic acid, urea hydrochloride, and benzoic acid, among others. Organic dicarboxylic acids such as oxalic acid, malonic acid, gluconic acid, itaconic acid, succinic acid, glutaric acid, maleic acid, fumaric acid, adipic acid, and terephthalic acid among others may also be useful in some embodiments. Any combination of these organic acids may also be used intermixed or with other organic acids.

Inorganic acids useful in accordance with this disclosure include sulfuric acid, sulfamic acid, methylsulfamic acid, hydrochloric acid, hydrobromic acid, and nitric acid among others. These acids may also be used in combination with other inorganic acids or with those organic acids mentioned above. In a preferred embodiment, the acid is an inorganic acid.

If included in the concentrated floor stripping composition, the acid source is preferably in a concentration between about 0.01 wt. % and about 10 wt. %, more preferably between about 0.01 wt. % and about 5 wt. %, most preferably between 0.01 wt. % and about 3 wt. %.

Alkalinity Source

The floor stripping compositions can optionally include an alkalinity source. In an embodiment containing an alkanolamine as a part of the solvent system, the alkanolamine provides alkalinity to the compositions. In such an embodiment, the pH of the composition can be affected by the other constituents and the concentration of the alkanolamine; thus, in some instances an alkalinity source may aid in achieving a desired alkaline pH. In embodiments that do not include an alkanolamine, an alkalinity source may be included in a higher concentration so as to achieve the desired pH.

Suitable alkalinity sources include weak bases and strong bases. In a preferred embodiment, the floor stripping compositions comprise both a weak base and a solid base. Examples of suitable alkalinity sources of the floor stripping compositions include, but are not limited to carbonate-based alkalinity sources, including, for example, carbonate salts such as alkali metal carbonates; caustic-based alkalinity sources, including, for example, alkali metal hydroxides; other suitable alkalinity sources may include metal silicate, metal borate, and organic alkalinity sources. Exemplary alkali metal carbonates that can be used include, but are not limited to, sodium carbonate, potassium carbonate, bicarbonate, sesquicarbonate, and mixtures thereof. Exemplary alkali metal hydroxides that can be used include, but are not limited to sodium, lithium, or potassium hydroxide. Exemplary metal silicates that can be used include, but are not limited to, sodium or potassium silicate or metasilicate. Exemplary metal borates include, but are not limited to, sodium or potassium borate.

Organic alkalinity sources are often strong nitrogen bases including, for example, ammonia (ammonium hydroxide), amines, alkanolamines, and amino alcohols. Typical examples of amines include primary, secondary or tertiary amines and diamines carrying at least one nitrogen linked hydrocarbon group, which represents a saturated or unsaturated linear or branched alkyl group having at least 10 carbon atoms and preferably 16-24 carbon atoms, or an aryl, aralkyl, or alkaryl group containing up to 24 carbon atoms, and wherein the optional other nitrogen linked groups are formed by optionally substituted alkyl groups, aryl group or aralkyl groups or polyalkoxy groups.

In general, alkalinity sources are commonly available in either aqueous or powdered form. The alkalinity can be added to the composition in any form known in the art, including as solid beads, granulated or particulate form, dissolved in an aqueous solution, or a combination thereof.

The alkalinity source can be included in the floor stripping compositions in any amount needed to achieve the desired pH of the compositions. In a preferred embodiment, the concentrated floor stripping compositions comprise between about 0.01 wt. % and about 10 wt. %, more preferably between about 0.01 wt. % and about 5 wt. %, and most preferably between about 0.01 wt. % and about 3 wt. % of an alkalinity source.

Water

The floor stripping compositions include water. Preferably, the water is soft water, most preferably distilled water and/or reverse osmosis water. The floor stripping compositions preferably comprise between about 5 wt. % and about 25 wt. % water, more preferably between about 8 wt. % and about 20 wt. % water, most preferably between about 10 wt. % and about 18 wt. %.

Additional Optional Ingredients

In embodiments of the invention, additional ingredients can be included in the floor stripping compositions. The additional ingredients provide desired properties and functionalities to the compositions. For the purpose of this application, the term "functional ingredient" includes a material that provides a beneficial property in a particular use. Some particular examples of functional materials are discussed in more detail below, although the particular materials discussed are given by way of example only, and that a broad variety of other functional ingredients may be used. Examples of such a functional materials include, but are not limited to, a dye, a fragrance, an oxidizer, a solvent, or mixtures thereof. A broad variety of other functional materials may also be included or excluded depending upon the desired characteristics and/or functionality of the composition. In a preferred embodiment, the compositions are substantially free of, or entirely free of, one or more of the following: cationic surfactants, silicon-based polymers and surfactants, foam boosters, ionic salts, and/or rheology modifiers.

In the context of some embodiments disclosed herein, the functional materials, or ingredients, are optionally included within the floor stripping compositions for their functional properties. Some more particular examples of functional materials are discussed in more detail below, but it should be understood by those of skill in the art and others that the particular materials discussed are given by way of example only, and that a broad variety of other functional materials may be used.

The amount of a particular optional functional ingredient can vary depending on the nature of the ingredient and property intended for the composition. Despite this it is generally expected that the concentrated floor stripping compositions comprise between 0 wt. % and about 10 wt. %, about 0.01 wt. % and about 8 wt. %, 0.01 wt. % and about 5 wt. % additional functional ingredients.

Dyes

The floor stripping compositions can optionally comprise a dye or colorant. Various dyes and other aesthetic enhancing agents can be included in the floor stripping compositions. Dyes may be included to alter the appearance of the composition, as for example, FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), Liquitint Green 1054, and the like.

If included in the concentrated floor stripping composition, a dye is preferably in a concentration between about 0.001 wt. % and about 5 wt. %, more preferably between about 0.01 wt. % and about 2 wt. %.

Fragrances

The floor stripping compositions can optionally comprise a fragrance. Various fragrances, odorants, perfumes, and other odor enhancing agents can be included in the floor stripping compositions. Preferred fragrances include, but are not limited to, terpenoids such as citronellol, aldehydes such as amyl cinnamaldehyde, a jasmine such as C1S-jasmine or jasmal, vanillin, fruit fragrances whether natural or synthetic, vegetable fragrances whether natural or synthetic, herb or spice fragrances whether natural or synthetic, and the like.

If included in the concentrated floor stripping composition, a fragrance is preferably in a concentration between about 0.01 wt. % and about 5 wt. %, more preferably between about 0.1 wt. % and about 2 wt. %.

Water Conditioning Agent

In some embodiments, the floor stripping compositions can optionally comprise a water conditioning agent. Preferred water conditioning agents, include, but are not limited to aminocarboxylates, condensed phosphates, phosphonates, polycarboxylic acid polymers, or a mixture thereof.

Preferred aminocarboxylates include, but are not limited to, ethylenediaminetetra-acetates (EDTA), glutamic-N,N-diacetic acid (GLDA) N-hydroxyethylethylenediaminetriacetates (HEDTA), methyl-glycine-diacetic acid (MGDA), nitrilo-triacetates (NTA), ethylenediamine tetrapro-prionates, triethylenetetraaminehexacetates, diethylenetriaminepentaacetates, and ethanoldi-glycines, salts and derivatives of the foregoing, alkali metal, ammonium, and substituted ammonium salts therein and mixtures thereof.

Preferred condensed phosphates include, but are not limited to, sodium and potassium orthophosphate, sodium and potassium pyrophosphate, sodium tripolyphosphate, sodium hexametaphosphate, and the like.

Preferred phosphonates, include, but are not limited to, 1-hydroxyethane-1,1-diphosphonic acid $CH_3C(OH)[PO$ $(OH)_2]_2$; aminotri(methylenephosphonic acid) $N[CH_2PO(OH)_2]_3$; aminotri(methylenephosphonate), sodium salt

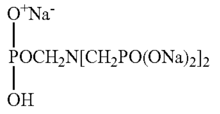

2-hydroxyethyliminobis(methylenephosphonic acid) $HOCH_2CH_2N[CH_2PO(OH)_2]_2$; diethylenetriaminepenta(methylenephosphonic acid) $(HO)_2POCH_2N[CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene) triamine(pentamethylenephosphonic acid) $(HO_2)POCH_2N[(CH_2)_6N[CH_2PO(OH)_2]_2]_2$; and phosphorus acid $H_3PO_3$. In some embodiments, a phosphonate combination such as ATMP and DTPMP may be used.

Suitable polycarboxylic acid polymer can be a homopolymer, copolymer, and/or terpolymer comprising polyacrylic acid, polymaleic acid, or a combination thereof. Preferred polycarboxylic acid polymers include a polyacrylic acid polymer having a weight average molecular weight of about 1,000 to about 100,000, a modified polyacrylic acid polymer having a weight average molecular weight of about 1,000 to about 100,000, or a polymaleic acid polymer having a weight average molecular weight of about 500 to about 5,000. In a most preferred embodiment, the water conditioning agent comprises a polycarboxylic acid polymer comprising a polymaleci acid polymer.

Examples of a suitable polycarboxylic acid polymer include: polyacrylic acid polymers, polyacrylic acid polymers modified by a fatty acid end group ("modified polyacrylic acid polymers"), and polymaleic acid polymers. Examples of suitable polyacrylic acid polymers and modified polyacrylic acid polymers include those having a weight average molecular weight of about 1,000 to about 100,000. Examples of suitable polymaleic acid polymers include those having a weight average molecular weight of about 500 to about 5,000. Suitable polycarboxylic acid polymers are available under the trade name Acusol, available from Rohm & Haas LLC, Philadelphia, Pa. and Belclene, available from Houghton Chemical Corporation, Boston, Mass.

In an embodiment of the floor stripping compositions that contain the optional water conditioning agent, the concentrated floor stripping compositions comprise between about 0.01 wt. % and about 10 wt. %, more preferably between about 0.01 wt. % and about 8 wt. %, and most preferably between about 0.1 wt. % and about 5 wt. % of the water conditioning agent.

Methods of Making the Floor Stripping Compositions

The floor stripping compositions can be prepared by any suitable method of preparation depending on the type of product to be prepared (i.e., concentrated or use solution). The liquid compositions can typically be made by forming the ingredients in an aqueous liquid or aqueous liquid solvent system. Such systems are typically made by dissolving or suspending the active ingredients in water or in compatible solvent and then diluting the product to an appropriate concentration, either to form a concentrate or a use solution thereof. Gelled compositions can be made similarly by dissolving or suspending the active ingredients in a compatible aqueous, aqueous liquid or mixed aqueous organic system including a gelling agent at an appropriate concentration.

The floor stripping compositions can be formed as a use solution by diluting the concentrated compositions. Preferably they are diluted with soft water, distilled water, or reverse osmosis water. Preferred dilution ratios include, but are not limited to, about 0.5 oz to 32 oz of floor stripping composition diluted with about 1 gallon of water. More preferably, about 1 oz to about 24 oz of floor stripping composition diluted with about 1 gallon of water. Most preferably, about 2 oz to about 16 oz of floor stripping composition diluted with about 1 gallon of water.

Methods of Using the Floor Stripping Compositions

While an understanding of the mechanism is not necessary to practice the floor stripping compositions described herein, and while the present embodiments are not limited to any particular mechanism of action, it is contemplated that, in some embodiments, the floor stripping compositions can be applied to a surface by contacting the surface of a floor. The contacting can be performed manually by a user or automatically by a machine (such as a robotic device, an autoscrubber, and/or a swing machine). If employing a swing machine, the user will often employ a wet vacuum to remove the stripping composition and stripped flooring after the abrasive actions. The contacting can be via pouring, mopping, rolling, or wiping. In a most preferred embodiment, the contacting is performed by pouring and/or mopping. Other mechanisms of applying/contacting the floor stripping compositions can be performed. In a preferred embodiment, the floor stripping compositions can be dispensed from a dispenser into a container (e.g., a bottle or bucket), a applicator (e.g., a wipe, a mop, a sponge, and/or a rag) or dispensed directly to a surface for stripping. Suitable dispensers can contain a concentrated composition or a use solution. In a preferred embodiment, a dispenser can both dilute a concentrated floor stripping composition and dispense it as a use solution.

Typically, the floor surface will have at least one layer of a floor finish. Preferably, the floor stripping composition is in contact with the surface for any amount of time sufficient to the desired number of layers of finish from the floor surface. In some embodiments, the contact time is at least about 5 minutes, at least about 6 minutes, at least about 7 minutes, at least about 8 minutes, at least about 9 minutes, at least about 10 minutes, at least about 11 minutes, at least about 12 minutes, at least about 13 minutes, at least about 14 minutes, at least about 15 minutes, at least about 16 minutes, at least about 17 minutes, at least about 18 minutes, at least about 20 minutes, at least about 21 minutes, at least about 22 minutes, at least about 23 minutes, at least about 24 minutes, at least about 25 minutes, at least about 26 minutes, at least about 27 minutes, at least about 28 minutes, at least about 29 minutes, at least about 30 minutes, at least about 31 minutes, at least about 32 minutes, at least about 33 minutes, at least about 34 minutes, at least about 35 minutes, at least about 36 minutes, at least about 37 minutes, at least about 38 minutes, at least about 39 minutes, at least about 40 minutes, at least about 41 minutes, at least about 42 minutes, at least about 43 minutes, at least about 44 minutes, at least about 45 minutes, at least about 46 minutes, at least about 47 minutes, at least about 48 minutes, at least about 49 minutes, at least about 50 minutes, at least about 51 minutes, at least about 52 minutes, at least about 53 minutes, at least about 54 minutes, at least about 55 minutes, at least about 56 minutes, at least about 57 minutes, at least about 58 minutes, at least about 59 minutes, at least about 60 minutes, at least about 65 minutes, at least about 70 minutes, at least about 75 minutes, at least about 80 minutes, at least about 85 minutes, at least about 90 minutes, at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, at least about 12 hours, at least about 15 hours, at least about 18 hours, at least about 21 hours, at least about 24 hours. If the floor stripping composition is remaining on the floor for a longer period of time, e.g., a time of 60 minutes or longer, it is preferably reapplied to avoid the floor stripping composition drying out. In some embodiments, the floor stripping compositions can be applied, stripped with an abrasive material, then reapplied and stripped with an abrasive material as many times as needed to strip the floor finish.

In some embodiments, the floor finish can be buffed, wiped, mopped, and/or sanded to aid in the removal of one or more layers of the floor finish. In some embodiments, the floor stripping composition can be applied multiple times by permitting a sufficient contact time to elapse between applications; this may be preferable for removing multiple layers of a floor finish. In a preferred embodiment, the abrasive material employed is a black abrasion pad, an SPP abrasion pad, or a hypro abrasion pad. Preferably, the abrasion material is comprised of polyester, nylon, or a combination thereof.

In some embodiments, the method can also include a step of applying a new finish.

Preferably, the floor stripping compositions can be applied to any suitable hard surface as defined herein. Preferred hard surfaces, include, but are not limited to floors, counters, walls, and the like. In a preferred aspect of the invention, the floor stripping compositions are suitable for stripping a variety of surface materials, including, but not limited to, luxury vinyl tile, linoleum, ceramic tile, composite tiles, including but not limited to vinyl composite tile (VCT).

In a preferred aspect of the invention, the floor stripping compositions remove a durable finishes, including, acrylic finishes and acrylic-polyurethane hybrid finishes. A benefit of the stripping compositions and methods disclosed herein is that they are capable of reducing the amount of time required that the stripping composition is contacted with the floor surface prior to abrasion. For example, in a preferred embodiment the compositions can be applied for a time of no more than about 30 minutes, no more than about 29 minutes, no more than about 28 minutes, no more than about 27 minutes, no more than about 26 minutes, no more than about 25 minutes, no more than about 24 minutes, no more than about 23 minutes, no more than about 22 minutes, no more than about 21 minutes, no more than about 20 minutes, no more than about 19 minutes, no more than about 18 minutes, no more than about 17 minutes, no more than about 16 minutes, or no more than about 15 minutes.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

Example Embodiments

The inventions are defined in the claims. However, below is provided a non-exhaustive list of non-limiting embodiments in numbered format. Any one or more of the features of these embodiments may be combined with any one or more features of another example, embodiment, or aspect described herein.

1. A floor stripping composition comprising: from about 50 wt. % to about 85 wt. % of a solvent system; wherein the solvent system comprises a first solvent and a second solvent; wherein the first solvent is benzyl alcohol and is in an amount of from about 35 wt. % to about 65 wt. % of the composition; from about 1 wt. % to about 12 wt. % of a nonionic surfactant system; wherein the nonionic surfactant system comprises at least two nonionic surfactants; wherein the composition contains less than 0.01 wt. % of a fluorinated surfactant; a coupler; and water.
2. The floor stripping composition of embodiment 1, wherein the second solvent is in a concentration of from about 5 wt. % to about 30 wt. %.
3. The floor stripping composition of any one of embodiments 1-2, wherein the second solvent comprises an alkanolamine.
4. The floor stripping composition of any one of embodiments 1-3, wherein the nonionic surfactant system comprises an EO/PO copolymer, a capped EO/PO copolymer, an alcohol alkoxylate, a capped alcohol alkoxylate, an extended alkoxylate, or a mixture thereof.
5. The floor stripping composition embodiment 4, wherein the surfactant system comprises a linear alcohol alkoxylate.
6. The floor stripping composition of embodiment 5, wherein the surfactant system comprises a linear alcohol alkoxylate having from about 1 to about 5 moles of alkoxylation and a linear alcohol alkoxylate having from about 7 to about 11 moles of alkoxylation.
7. The floor stripping composition of embodiment 6, wherein the linear alcohol alkoxylate having from about 1 to about 5 moles of alkoxylation has a carbon chain length of from 6 to 20 carbons; and wherein the linear alcohol alkoxylate having from about 7 to about 11 moles of alkoxylation has a carbon chain length of from 6 to 20 carbons.
8. The floor stripping composition of any one of embodiments 1-7, further comprising a pH modifier.
9. The floor stripping composition of embodiment 8, wherein the pH modifier is an alkalinity source.
10. The floor stripping composition of any one of embodiments 1-9, wherein the solvent is free of an ether-based solvent.
11. The floor stripping composition of any one of embodiments 1-10, wherein the nonionic surfactant is from about 1 wt. % to about 12 wt. % of the floor stripping composition.
12. The floor stripping composition of any one of embodiments 1-11, wherein the coupler is from about 5 wt. % to about 20 wt. % of the floor stripping composition.
13. The floor stripping composition of any one of embodiments 1-12, wherein the water is from about 5 wt. % to about 25 wt. % of the floor stripping composition.
14. The floor stripping composition of any one of embodiments 1-13, wherein the first solvent from about 40 wt. % to about 60 wt. % of the floor stripping composition and the second solvent is from about 10 wt. % to about 25 wt. % of the floor stripping composition.
15. The floor stripping composition of any one of embodiments 1-14, wherein the at least two nonionic surfactants comprise a first nonionic surfactant from about 0.5 wt. % to about 6 wt. % of the floor stripping composition and a second nonionic surfactant from about 0.5 wt. % to about 6 wt. % of the floor stripping composition.

16. The floor stripping composition of embodiment 15, wherein the first nonionic surfactant is an alkoxylated nonionic surfactant having from about 1 to about 5 moles of alkoxylation, and wherein the second nonionic surfactant is an alkoxylated nonionic surfactant having from about 7 to about 11 moles of alkoxylation
17. A floor stripping composition comprising: from about 50 wt. % to about 85 wt. % of a solvent system; wherein the solvent system comprises benzyl alcohol and an alkanolamine; from about 1 wt. % to about 12 wt. % of a nonionic surfactant system; wherein the nonionic surfactant system comprises a first nonionic surfactant, wherein the first nonionic surfactant is an alkoxylated nonionic surfactant having from about 1 to about 5 moles of alkoxylation, and a second nonionic surfactant, wherein the second nonionic surfactant is an alkoxylated nonionic surfactant having from about 7 to about 11 moles of alkoxylation; wherein the composition contains less than 0.01 wt. % of a fluorinated surfactant; from about 5 wt. % to about 20 wt. % of a coupler; and from about 5 wt. % to about 25 wt. % of water.
18. The floor stripping composition of embodiment 17, wherein the benzyl alcohol is from about 40 wt. % to about 60 wt. % of the floor stripping composition, and wherein the alkanolamine is from about 10 wt. % to about 25 wt. % of the floor stripping composition.
19. The floor stripping composition of embodiment 17 or embodiments 18, wherein the first nonionic surfactant is from about 0.5 wt. % to about 6 wt. % of the floor stripping composition, and wherein the second nonionic surfactant is from about 0.5 wt. % to about 6 wt. % of the floor stripping composition.
20. The floor stripping composition of any one of embodiments 17-19, further comprising a pH modifier.
21. The floor stripping composition of embodiment 20, wherein the pH modifier is an alkalinity source.
22. The floor stripping composition of any one of embodiments 1-21, wherein the composition has a pH of from about 12.0 to about 14.0.
23. The floor stripping composition of any one of embodiments 1-22, wherein the composition has a viscosity of less than about 100 cps.
24. The floor stripping composition of any one of embodiments 1-23, wherein the composition has a surface tension of equal to or less than 29 mN/m.
25. The floor stripping composition of any one of embodiments 1-24, further comprising a dye, a fragrance, a water conditioning agent, or a mixture thereof.
26. The floor stripping composition of any one of embodiments 1-25, wherein the composition is diluted at a ratio of about 4 oz. to about 32 oz. of floor stripping composition to about 1 gallon of water.
27. A method of stripping a floor finish comprising: diluting the floor stripping composition of any one of embodiments 1-25 to form a use solution; contacting a surface of a resilient floor with the use solution; wherein the surface of the resilient floor comprises a finish.
28. The method of embodiment 27, wherein the contacting is performed manually, by a robotic device, by an autoscrubber, or by a swing machine.

29. The method of any one of embodiments 27-28, wherein the contacting is performed by wiping, pouring, rolling, and/or mopping the surface with the floor stripping composition.
30. The method of any one of embodiments 27-29, wherein the diluting is at a ratio of about 8 oz. to about 32 oz. of the floor stripping composition to about 1 gallon of water.
31. The method of any one of embodiments 27-30, wherein the resilient floor is a vinyl composite tile, a ceramic tile, a linoleum floor, or a luxury vinyl tile.
32. The method of any one of embodiments 27-31, further comprising a step of reapplying the use solution to the surface of the resilient floor.
33. The method of any one of embodiments 1-32, wherein the use solution is in contact with the surface of the resilient floor for a time between about 5 minutes and about 45 minutes.
34. The method of any one of embodiments 1-33, wherein the use solution is in contact with the surface of the resilient floor for a time between about 5 minutes and about 30 minutes.
35. The method of any one of embodiments 1-34, wherein the use solution is in contact with the surface of the resilient floor for a time between about 5 minutes and about 20 minutes.
36. The method of any one of embodiments 27-35, wherein the surface of the finish comprises an acrylic finish or an acrylic-polyurethane hybrid finish.
37. The method of embodiment 36, wherein the finish comprises at least one layer; and wherein at least one layer of the finish is removed.
38. The method of embodiment 37, further comprising applying a hardenable floor finish to the surface of the floor.

EXAMPLES

Embodiments of the floor stripping compositions and methods of using the same are demonstrated in the following non-limiting Examples. It should be understood that these Examples, while indicating one or more preferred embodiments, are given by way of illustration only and are non-limiting. From the above discussion and these Examples, one skilled in the art can ascertain the essential characteristics of the invention(s), and without departing from the spirit and scope thereof, can make various changes and modifications of the embodiments of the invention to adapt it to various usages and conditions. Thus, various modifications of the embodiments, in addition to those shown and described herein, will be apparent to those skilled in the art from the foregoing description. Such modifications are also intended to fall within the scope of the appended claims.

Materials Used:

SURFONIC® L24-9: Linear $C_{12-14}$ alcohol ethoxylate with 9 moles of EO, available from Huntsman.

TOMADOL® 25-3: An ethoxylated alcohol surfactant with 3 moles of EO, available from Evonik.

TERGITOL® TMN3: A secondary alcohol ethoxylate, available from DOW.

Commercially available linear alkylbenzene sulfonate (LAS), fluorinated anionic surfactant, monoethanolamine (MEA), sodium hydroxide, oleic acid, sodium xylene sulfonate, and benzyl alcohol.

Formulations were prepared according to Table 3 for testing.

TABLE 3

| Liquid Floor Stripping Compositions for Testing | | | | |
|---|---|---|---|---|
| Ingredient | Control | Formula 1 | Formula 2 | Formula 3 |
| Water | 21.15 | 11.5 | 15.5 | 12.5 |
| NaOH (50%) | 3 | — | — | 3 |
| MEA | 19 | 19 | 19 | 19 |
| Benzyl Alcohol | 50 | 50 | 50 | 50 |
| Fluorinated anionic surfactant | 0.05 | — | — | — |
| SXS (40%) | — | 11.5 | 11.5 | 11.5 |
| Surfonic L24-9 | — | 4 | 2 | 2 |
| Tomadol 25-3 | — | 4 | 2 | 2 |
| Tergitol TMN-3 | 2 | — | — | — |
| LAS (96%) | 3 | — | — | — |
| Oleic Acid | 1.8 | — | — | — |

A commercially available fluorinated surfactant floor stripping composition was employed as the control as shown in Table 3. Similar solvent systems in the test formulations were employed to more directly evaluate the effect of the surfactants on performance.

Example 1

Various floor stripping compositions were evaluated by measuring the average contact angle and surface tension of the compositions. These measurements were taken under the same conditions (room temperature and ambient humidity) with a surface tensiometer and optical tensiometer. Three exemplary floor stripping compositions of the present application ("Formula 1". "Formula 2", and "Formula 3") were compared against the Control. The exemplary floor stripping compositions and the control were prepared by diluting to 0.2% in distilled water. The compositions were tested on tiles with an acrylic floor finish and a acrylic-polyurethane hybrid floor finish (considered a durable floor finish). The contact angle and surface tension measurements are shown in Table 4. The lower the contact angle, the more favorable the wetting properties of the floor stripping composition. Similarly, a lower surface tension is indicative of better wetting properties. The contact angle is influenced by the floor surface type. While we tested against common floor surface types to obtain a general idea as to how the different formulas faired against each other and against the control, it is not determinative as to the wetting properties specific floor types. The surface tension was also measured as a more objective indicator as to the wetting properties independent of the influence a particular floor type present. The results of these measurements are shown in Table 4.

TABLE 4

| Formula name (0.2% in DI water, RT) | Average contact angle | Surface tension (mN/m) |
|---|---|---|
| Water | 61.9 | 73.46 |
| Control | 27.6 | 29.57 |
| Formula 1 | 24.9 | 28.67 |
| Formula 2 | 32.9 | 28.65 |
| Formula 3 | 28.8 | 28.77 |

As can be seen in Table 4, each of the exemplary floor stripping compositions had lower surface tension measurements than the control. Further, they exhibited average contact angles which were around that of the control.

Example 2

The various floor stripping compositions of Example 1 (exemplary floor stripping compositions and control) were evaluated by measuring the visual spreading/wetting on a polyurethane durable coated tile. The compositions were prepared by diluting in soft water in a 1:4 ratio. The diluted floor stripping compositions were then applied and immediately observed, as shown in FIG. 1. The diluted floor stripping compositions continued to be observed over a period of time and were applied a second time, as shown in FIGS. 2A-2D for the Control, Formula 1, Formula 2, and Formula 3, respectively.

Figure 3A:
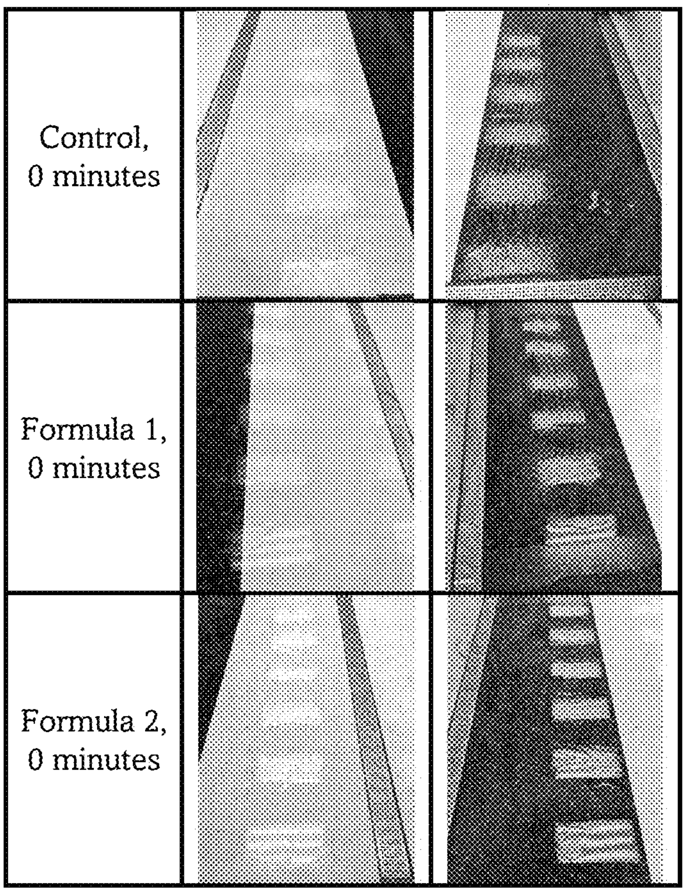
FIG. 3A is a series of photographs showing the spreading of floor stripping compositions immediately after application.
Figure 3B:
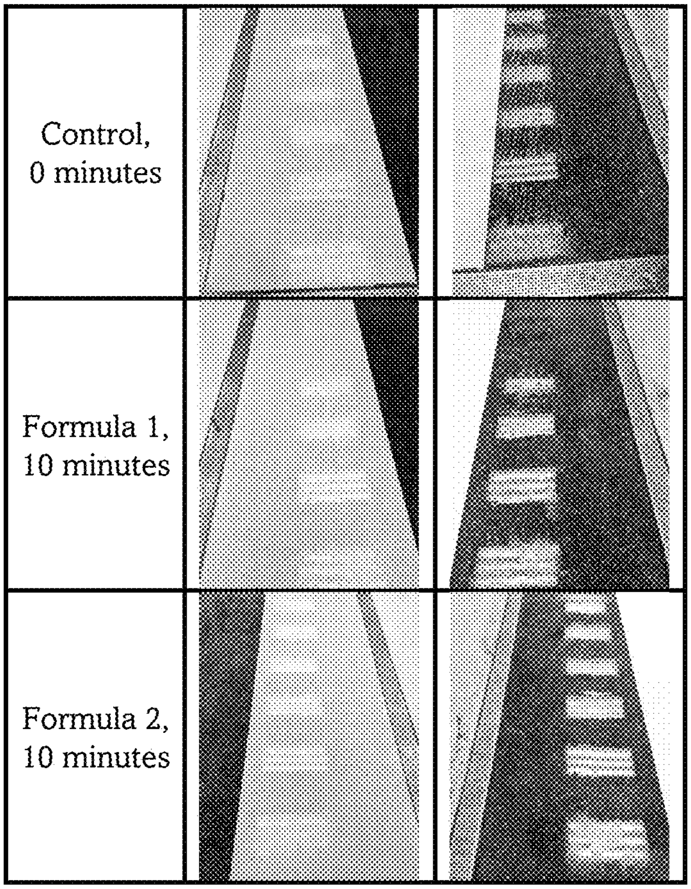
FIG. 3B is a series of photographs showing the spreading of floor stripping compositions ten minutes after application.

The same diluted floor stripping compositions were also applied and observed on a larger coated tile surface, as shown in FIGS. 3A-3B, comparing the inline dilution against two exemplary floor stripper diluted compositions (Formula 1 and 2) immediately after application (FIG. 3A) and 10 minutes after application (FIG. 3B). Observations of these comparisons are summarized in Table 5 where $t_0$ refers to the observation immediately after application and $t_{10\ mins}$ refers to the observation 10 minutes after application.

TABLE 5

| | Control | Formula 1 | Formula 2 |
|---|---|---|---|
| Wetting at $t_0$ | Okay | Okay | Good |
| Spreading at $t_0$ | Okay | Okay | Good |
| Wetting at $t_{10\ mins}$ | Poor | Good | Good |
| spreading at $t_{10\ mins}$ | Poor | Good | Good |

As can be seen in the Figures, the test compositions of this disclosure provided better wetting and spreading compared against the fluorinated surfactant composition.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A floor stripping composition comprising:

from about 55 wt. % to about 85 wt. % of a solvent system; wherein the solvent system comprises a first solvent and a second solvent; wherein the first solvent is benzyl alcohol and is in an amount of from about 50 wt. % to about 65 wt. % of the composition;

from about 1 wt. % to about 12 wt. % of a nonionic surfactant system; wherein the nonionic surfactant system comprises at least two nonionic surfactants; wherein the composition contains less than 0.01 wt. % of a fluorinated surfactant;

a coupler; wherein the coupler comprises sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, sodium butylnaphthalene sulfonate, or a mixture thereof; and water.

2. The floor stripping composition of claim 1, wherein the second solvent is in a concentration of from about 5 wt. % to about 30 wt. %; and wherein the second solvent comprises an alkanolamine.

3. The floor stripping composition of claim 1, wherein the nonionic surfactant system comprises an EO/PO copolymer, a capped EO/PO copolymer, an alcohol alkoxylate, a capped alcohol alkoxylate, an extended alkoxylate, or a mixture thereof.

4. The floor stripping composition of claim 3, wherein the surfactant system comprises a linear alcohol alkoxylate having from about 1 to about 5 moles of alkoxylation and a linear alcohol alkoxylate having from about 7 to about 11 moles of alkoxylation.

5. The floor stripping composition of claim 4, wherein the linear alcohol alkoxylate having from about 1 to about 5 moles of alkoxylation has a carbon chain length of from 6 to 20 carbons; and wherein the linear alcohol alkoxylate having from about 7 to about 11 moles of alkoxylation has a carbon chain length of from 6 to 20 carbons.

6. The floor stripping composition of claim 1, further comprising a dye, a fragrance, a pH modifier, water conditioning agent, or a mixture thereof.

7. The floor stripping composition of claim 1, wherein the solvent is free of an ether-based solvent.

8. The floor stripping composition of claim 1 wherein the nonionic surfactant is from about 1 wt. % to about 12 wt. % of the floor stripping composition; wherein the coupler is from about 5 wt. % to about 20 wt. % of the floor stripping composition; wherein the water is from about 5 wt. % to about 25 wt. % of the floor stripping composition; wherein the first solvent is from about 40 wt. % to about 60 wt. % of the floor stripping composition and the second solvent is from about 10 wt. % to about 25 wt. % of the floor stripping composition.

9. The floor stripping composition of claim 8, wherein the at least two nonionic surfactants comprise a first nonionic surfactant from about 0.5 wt. % to about 6 wt. % of the floor stripping composition and a second nonionic surfactant from about 0.5 wt. % to about 6 wt. % of the floor stripping composition; and wherein the first nonionic surfactant is an alkoxylated nonionic surfactant having from about 1 to about 5 moles of alkoxylation, and wherein the second nonionic surfactant is an alkoxylated nonionic surfactant having from about 7 to about 11 moles of alkoxylation.

10. The floor stripping composition of claim 1, wherein the composition has a pH of from about 12.0 to about 14.0.

11. The floor stripping composition of claim 1, wherein the composition has a viscosity of less than about 100 cps.

12. The floor stripping composition of claim 1, wherein the composition has a surface tension of equal to or less than 29 mN/m.

13. A method of stripping a floor finish comprising:

diluting the floor stripping composition of claim 1 to form a use solution; wherein the composition is diluted at a ratio of about 4 oz. to about 32 oz. of floor stripping composition to about 1 gallon of water;

contacting a surface of a resilient floor with the use solution; wherein the surface of the resilient floor comprises a finish; wherein the finish comprises at least one layer; and wherein at least one layer of the finish is removed.

14. The method of claim 13, wherein the contacting is performed manually, by a robotic device, by an autoscrubber, or by a swing machine.

15. The method of claim 13, wherein the contacting is performed by wiping, pouring, rolling, and/or mopping the surface with the floor stripping composition.

16. The method of claim 13, wherein the resilient floor is a vinyl composite tile, a ceramic tile, a linoleum floor, or a luxury vinyl tile.

17. The method of claim 13, further comprising a step of reapplying the use solution to the surface of the resilient floor.

18. The method of claim 13, wherein the use solution is in contact with the surface of the resilient floor for a time between about 5 minutes and about 45 minutes.

19. The method of claim 13, wherein the surface of the finish comprises an acrylic finish or an acrylic-polyurethane hybrid finish.

20. The method of claim 13, further comprising applying a hardenable floor finish to the surface of the floor.

* * * * *